United States Patent [19]

Gutman

[11] Patent Number: 5,224,377
[45] Date of Patent: Jul. 6, 1993

[54] RIGID TEST TABLE FOR GEAR SETS

[75] Inventor: Yevsey Gutman, Minneapolis, Minn.

[73] Assignee: GEI Systems, Inc., Minneapolis, Minn.

[21] Appl. No.: 928,900

[22] Filed: Aug. 12, 1992

[51] Int. Cl.⁵ .................... G01M 13/02; B23Q 3/04; B23Q 3/06; B23Q 1/04
[52] U.S. Cl. .................... 73/162; 33/501.13; 33/573; 269/71; 269/73
[58] Field of Search ............ 33/501.13, 199 R, 199 B, 33/573; 73/162; 269/71, 73

[56] References Cited

U.S. PATENT DOCUMENTS

| | | | |
|---|---|---|---|
| 3,099,901 | 8/1963 | Hunkeler | 51/26 |
| 3,176,512 | 4/1965 | Hediger | 73/162 |
| 3,321,840 | 5/1967 | Pedersen | 33/179.5 |
| 3,404,443 | 10/1968 | Cinanni | 29/90 |
| 3,528,286 | 9/1970 | Bergemann et al. | 73/162 |
| 3,583,072 | 6/1971 | Muller | 33/501.13 |
| 3,604,120 | 9/1971 | Muller | 33/501.13 |
| 3,611,800 | 10/1971 | Howlett et al. | 73/162 |
| 3,686,801 | 8/1972 | Ellwanger | 51/215 R |
| 3,712,000 | 1/1973 | Spear | 51/287 |
| 3,717,958 | 2/1973 | Ellwanger et al. | 51/26 |
| 3,795,143 | 3/1974 | Deppez et al. | 73/162 |
| 3,829,978 | 8/1974 | Basin et al. | 269/71 X |
| 4,024,757 | 5/1977 | Raess et al. | 73/162 |
| 4,618,256 | 10/1986 | Bartolomeo | 356/23 |
| 4,831,872 | 5/1989 | Huang et al. | 73/162 |

FOREIGN PATENT DOCUMENTS

| | | | |
|---|---|---|---|
| 2815407 | 10/1979 | Fed. Rep. of Germany | 269/71 |
| 0250988 | 10/1987 | Fed. Rep. of Germany | 33/501.13 |
| 0448403 | 3/1950 | Italy | 33/501.13 |
| 0073680 | 6/1978 | Japan | 269/71 |
| 0093325 | 7/1981 | Japan | 269/71 |
| 0171229 | 10/1983 | Japan | 269/73 |
| 0188037 | 8/1986 | Japan | 269/71 |
| 0180447 | 8/1962 | Switzerland | 33/501.13 |
| 0373568 | 6/1973 | U.S.S.R. | 73/162 |
| 0681719 | 10/1952 | United Kingdom | 73/162 |
| 0869771 | 6/1961 | United Kingdom | 73/162 |

OTHER PUBLICATIONS

Oerlikon Spiromatic contex T20 CNC Bevel and Hypoid Gear Tester by Dr. Hermann J. Stadtfeld, Dec. 1990.
Gleason No. 512 Hypoid Tester, Nov. 1969.
Bevel Gear Lapping Machines LKR 851 and LKR 1600, as well as Bevel Gear Running Testers GKP 851 and GKP 1600 by Klingelnberg (Date Unknown).
Bevel Gear Running Testers by Klingelnberg (Date Unknown).
General Line Brochure, The Gleason Works, 1990.
The Institute of Mechanical Engineers, *A Platform with Six Degrees of Freedom*, by D. Steward, Proceedings 1965-66—vol. 180, Part, 1, No. 15.
*Understanding the 513 Bevel Gear Test Machine*, The Gleason Works, pp. 1—1, 4-2 through 4-3 and accompanying figures (Date Unknown).

*Primary Examiner*—William A. Cuchlinski, Jr.
*Assistant Examiner*—Diego F. F. Gutierrez
*Attorney, Agent, or Firm*—Kinney & Lange

[57] ABSTRACT

A test system providing a very rigid support for gear testing, having a pair of spaced apart generally parallel plates that are connected together. Each of the plates has an actuator section for operation against a flange of a gear mounting carriage positioned between the plates to control the gear position relative to the plates. Three actuators are spaced around the axis of the gear mounting housing so that control of the housing in at least three degrees of freedom can be achieved. Additional actuators control the positioning of the housing in direction parallel to the spaced apart plates and such actuators are mounted between the plates for increasing rigidity.

19 Claims, 6 Drawing Sheets

RIGID TEST TABLE FOR GEAR SETS

CROSS-REFERENCE TO RELATED APPLICATIONS

Reference is made to my co-pending applications Ser. No. 07/928,808, filed Aug. 12, 1992 entitled GEAR TESTER WITH ACTUATOR SUPPORTED PLATFORM; Ser. No. 07/929,151, filed Aug. 12, 1992 entitled CONTROLLABLE GEAR TESTING SYSTEM; and Ser. No. 07/929,835, filed Aug. 12, 1992 entitled GEAR TESTER CONTROLLING SELECTED DEGREES OF FREEDOM.

BACKGROUND OF THE INVENTION

The present invention relates to a gear testing setup for supporting a gear relative to a pinion in desired degrees of freedom utilizing a rigid frame structure and hydrostatic supports for the structure, together with built in servocontroller actuators.

Various standard gear testers for testing sets of gears have been advanced but they are difficult to precisely control and cannot simulate actual conditions easily. Further, obtaining a very rigid test apparatus is desirable and in the prior art the tables were merely made more massive to accomplish that end.

SUMMARY THE INVENTION

The present invention relates to a support assembly for rigidly holding a gear spindle carriage in a gear testing machine, and to permit movement of the gear spindle carriage in at least three degrees of freedom as shown in pitch, roll and axial (vertical). These three degrees of freedom are controlled by one set of servo actuators acting parallel to the rotational axis of the gear spindle. By utilizing actuators at 120 degrees around the axis of the spindle, which are integrated into the support in a "sandwich construction", a very rigid assembly is formed.

The frame assembly utilizes vertically directed hydrostatic bearings for supporting the gear spindle carriage to ensure reduced friction for movement, when using actuators that are integrated as part of the support table or frame. The overall assembly thus gives rigidity and precise control while being compact in size. The hydraulic actuators are constructed to have very small oil volumes to reduce the effects of compressibility of the oil.

In an alternate embodiment, screw type actuators are used for obtaining movement of the gear spindle carriage in at least three degrees of freedom and for further reduced oil, column compressibility of the hydraulic actuators for greater rigidity.

DETAILED DESCRIPTION OF THE PREFERRED EMBODIMENTS

Figure 1:
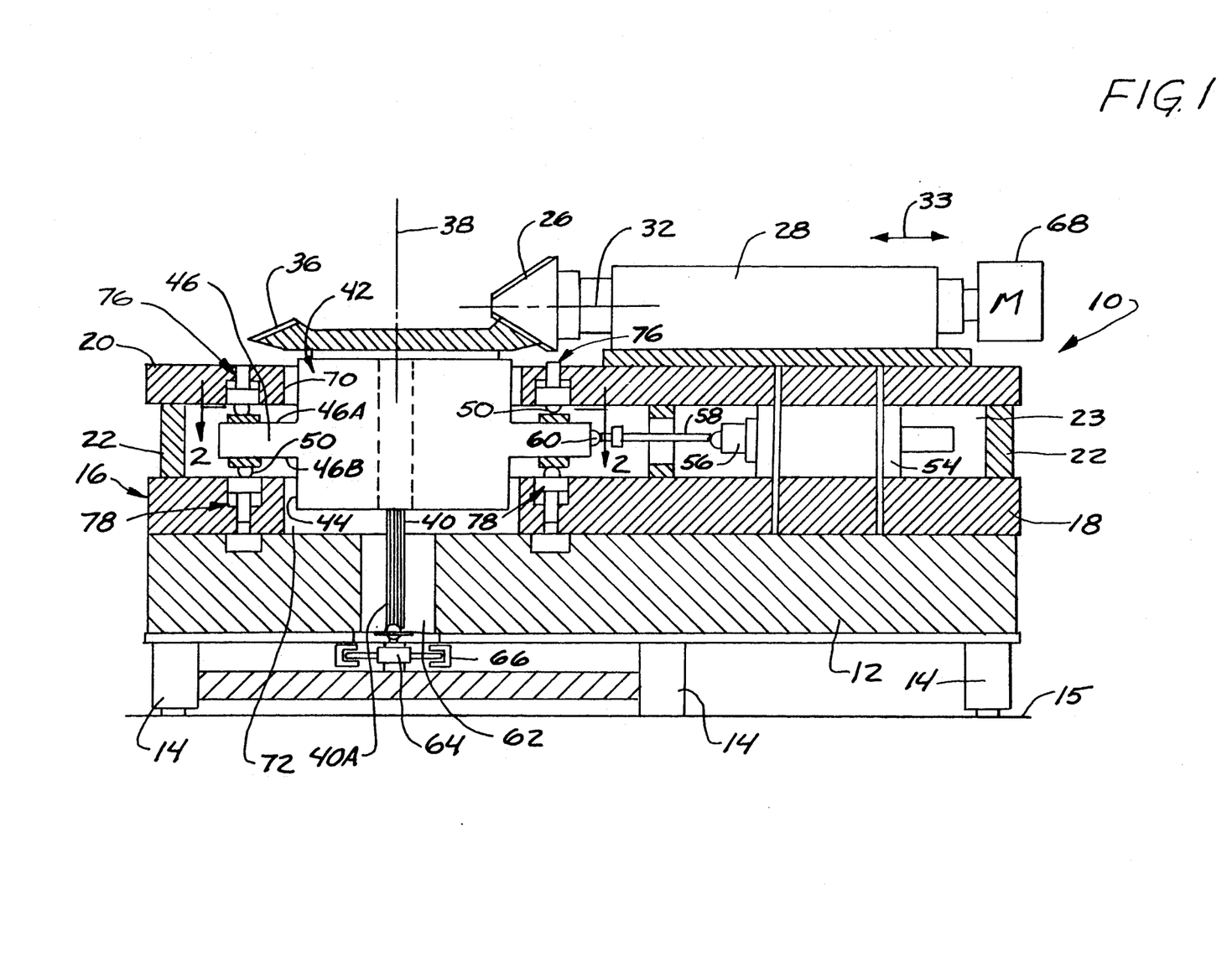
FIG. 1 is a schematic side elevational sectional view of a gear testing apparatus made according to the present invention.

Referring to FIG. 1, a gear testing assembly indicated generally at 10 comprises a rigid granite base plate 12 supported on suitable legs 14 relative to a floor 15, forming a rigid support. The testing assembly 10 includes a gear support subassembly 16 comprising a main mounting plate 18 that rests on the base plate 12 and a top plate 20 supported relative to the main mounting plate is with suitable standoff walls 22 located as desired. The mounting plate 18 and the top plate 20 define a space 23 therebetween in which components can be mounted.

In testing a gear set, as described in the co-pending applications identified above, a gear and a pinion set are mounted onto the subassembly 16 for movement in the desired degrees of freedom relative to each other. A pinion 26 is mounted in a pinion housing 28 that can be adjusted relative to the top plate 20 in a suitable manner, along two perpendicular axes lying in the plane of the top of the top plate 20, that is, in directions along a pinion axis 32 as indicated by a double arrow 33 and along an axis perpendicular thereto. The pinion axis 32 is the axis about which the pinion 26 rotates.

Since the pinion axis 32 is fixed once the rough setting of the gear set is achieved, the necessary degrees of freedom or movements in order to properly position the gear relative to the fixed position pinion are controlled precisely. An actuator which will act in direction along the axis of the gear, and actuators which act in two orthogonal directions perpendicular to the axis of the gear are used. As is explained in detail in the co-pending applications, identified above, four degrees of freedom is all that is necessary for controlling a gear set to be tested. The necessary degrees of freedom will be controlled with the present apparatus.

A gear to be tested indicated at 36 has a central axis 38 that is the center of a gear shaft 40 which is mounted in suitable bearings in a gear spindle carriage 42. The gear spindle carriage 42 has a central hub 44 and an annular flange 46 which extends around the hub 44. The flange 46 has top and bottom surfaces 46A and 46B.

Figure 2:
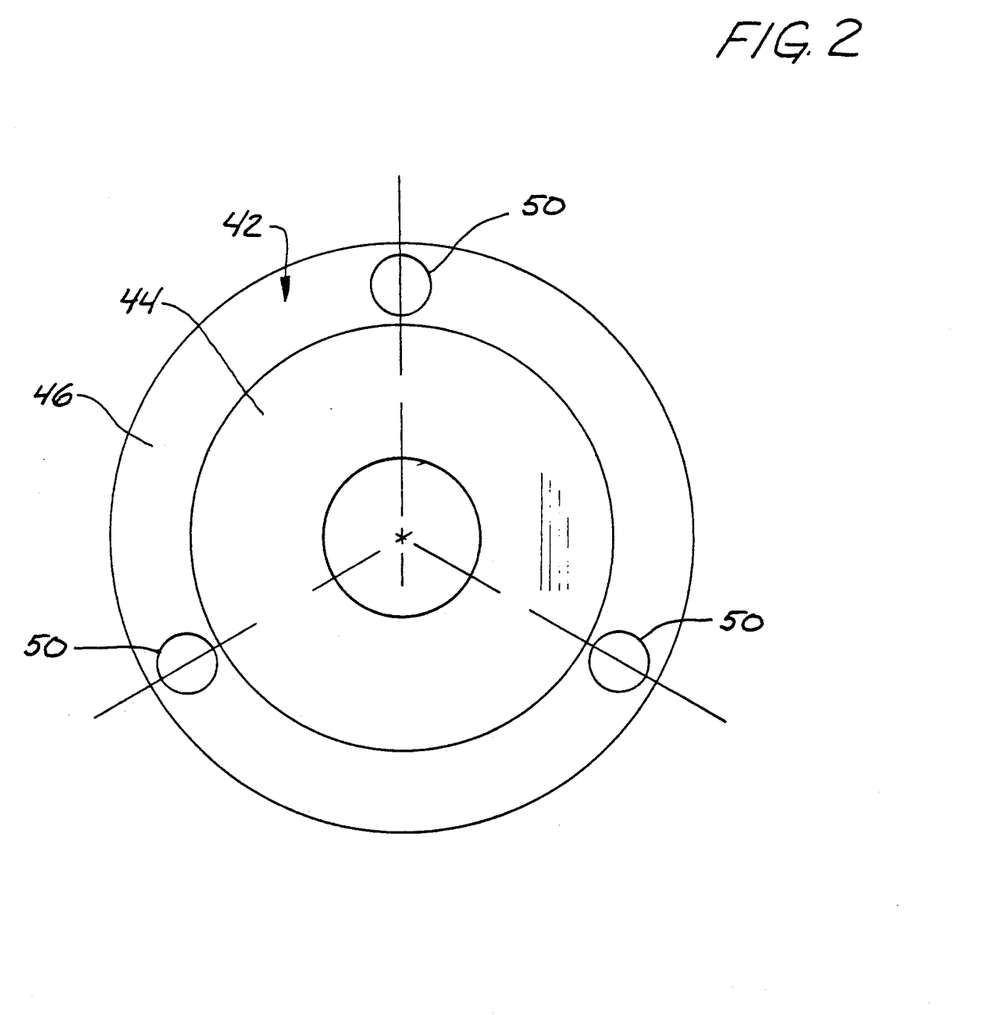
FIG. 2 is a schematic plan view of a support for a gear to be tested taken generally along line 2—2 in FIG. 1.

As can be seen in FIG. 2, three support actuators 50 are positioned 120 degrees apart and are made to act upon the annular flange 46 to control its position in direction along the central axis 38, as well as control the angle of the central axis 38 relative to the pinion 26 in two different planes. In other words, the included angle between the pinion axis 32 and the central axis 38, which is known as the shaft angle, can be controlled, and the angle of the central axis 38 about the axis pinion 32 also can be controlled by the support actuators 50.

In FIG. 1, the support actuators 50 are shown on both sides of the flange 46 for convenience. Additionally, one of the features of the present invention is that horizontal actuators (there would be three provided for complete control) indicated at 54 can be clamped between the mounting plate 18 and the top plate 20 to increase rigidity, as well as provide movable shafts 56 acting through links 58 and connected to a side 60 of the flange 46 to provide for position control along two mutually perpendicular axes each defining a plane that is perpendicular to the central axis 38. As the central axis 38 tilts, the loading axis of the horizontal actuators 54 and the rods 56 would no longer be in the defined plane of movement, which is constrained by the support actuators 50, but the forces acting would be in lateral directions in two mutually perpendicular axes. The gear spindle carriage 42 can be controlled in six degrees of freedom for positioning the gear 36 in a desired location.

Prior to explaining the support and actuator assembly, it also should be noted that in FIG. 1 an extension 40A of the gear shaft 40 extends through an opening 62 in the granite base plate 12, and is suitably coupled to a disc brake assembly 64 having a disc brake caliper 66 fixed to the granite base plate 12 on suitable supports. The disc brake assembly 64 exerts a brake load on a brake disc attached to the extension 40A and thus the gear shaft 40, which in turn exerts a brake load on the gear 36 so that when the spindle 26 is driven from a motor 68, the disc brake assembly 64 will create a torque load on the system. The disc brake assembly 64 can be any desired configuration which would not wear out or overheat in use and which forms a means for exerting a torque load on the gear shaft 40.

A very rigid table assembly is made by the sandwich-type construction of the mounting and top plates 18 and 20 with the standoff walls 22. In addition, rigidity is gained by clamping the horizontal actuators 54 tightly between the mounting and top plates 18 and 20.

Figure 3:
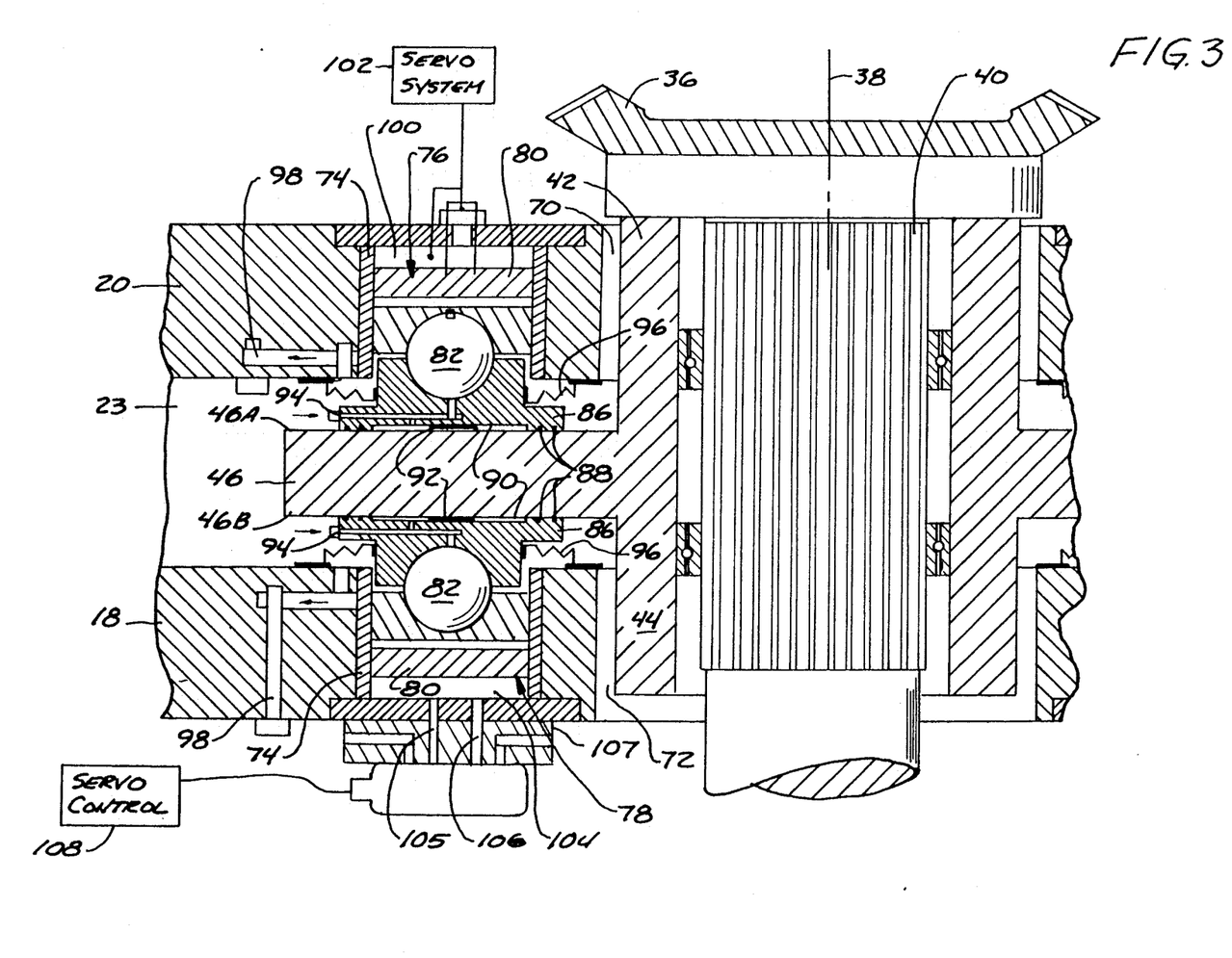
FIG. 3 is an enlarged sectional view of a support for a gear spindle housing integrated into the support members and utilizing integrated actuators.

The support actuators 50 are shown in detail in FIG. 3. In this form of the invention, the representation of the gear spindle carriage 42 is slightly different, but the flange 46 is shown and the central shaft 40 is also illustrated along with the gear 36 and the central axis 38.

The central hub 44 extends through a suitable opening 70 in the top plate 20, and an opening 72 in the mounting plate 18. This permits the flange 46, which is of smaller thickness dimension than the vertical dimension of the space 23, to be positioned in the space 23 between the mounting plate 18 and the top plate 20 so that the flange 46 can move vertically, or in other words in direction along the central axis 38. The central hub 44 thus can be tilted slightly to change the angle of the central axis 38 relative to the pinion axis 32.

Each of the support actuators 50 is constructed as shown in FIG. 3, and each has two parts, an upper cylinder and a lower cylinder of symmetric design.

There are bores or holes in the top plate 20 and the mounting plate 18 and each of the upper and lower cylinders has a cylinder sleeve 74 pressed into the respective bore. The upper and lower cylinders form an upper half actuator cylinder 76, and a lower half actuator cylinder 78, which are identically constructed. A separate piston 80 is mounted in each of the upper half and lower half actuator cylinders 76, 78, and is properly sealed for sliding movement inside the cylinders. Each piston 80 has a part-spherical surface that will receive a ball 82 to permit the ball to be loaded in compression. The ball 82 projects out of the respective actuator cylinder on the end of the cylinder facing the flange 46, and each ball 82 is made to be seated in a receptacle in a separate sliding shoe 86. One sliding shoe 86 engages the surface 46A and the other sliding shoe 86 engages the surface 46B. The shoes 86 have inner ends that provide hydrostatic bearings running on the surfaces 46A and 46B, respectively, in a known manner. Suitable seals 88 are provided near the outer periphery of the flanges of the shoes 86 where they engage the surfaces 46A and 46B, and these seals surround small cavities 90 in the respective shoes 86. The cavities 90 form hydrostatic bearings by providing an inlet for oil and, in addition, each of the cavities 90 mounts a low friction material pad 92 for additional precautions in case the hydrostatic bearings are inoperable. Dry bearing material such as Teflon ® can be utilized for the pads 92.

Oil for the hydrostatic bearings is provided through a suitable port and passageway indicated generally at 94 on each of the shoes 86, and this oil in the passageway 94 also provides lubrication for the surfaces of the respective ball 82 which is in the receptacles in the corresponding shoe 86.

Suitable seals 96 are provided for trapping any of the oil leaking past the balls 82 (a very low volume is used) and this oil then can run out to drain through drains 98.

The surface portions of the balls 82 that fit into the pistons 80 can be restrained from movement with a suitable pin to ensure that they do not move unnecessarily in relation to the piston surfaces. The lubrication that is provided through the passageways 94 permits enough movement for the ball 82 when the gear spindle carriage 42 is tilted or controlled as desired.

It also should be noted that the passageway 94 and drain 98 are a secondary system with very low pressure and are not part of the servocontrols for the actuators themselves.

In utilizing the pistons 80 of the present invention, a chamber 100 formed above the piston 80 mounted in the upper half actuator cylinder 76 is connected through a suitable port to a servo system 102, or other constant pressure sources that will maintain a constant force on the piston 80. The force on this side of the support actuator 50 is a function of the pressure times the area of the piston 80. If the servosystem 102 or other pressure source keeps the level of 300 psi and the piston diameter was 3.5 inches, the force would be about 3,000 pounds downwardly. A sufficiently large volume accumulator also could be used.

A chamber 104 is formed below the piston 80 mounted in the lower half actuator cylinder 78 and it is connected through suitable passageways 105 and 106 to a servovalve 107 that is schematically shown. The servovalve 107 in turn is connected to suitable servocontrols indicated generally at 108. By way of example only the pressure in the chamber 104 can be regulated through suitable feedback controls to being slightly over 300 psi or slightly more than the pressure in the chamber 100, and the upper and lower half actuator cylinders 76 and 78 of each support actuator 50 are thus in equilibrium and hold the flange 46 at a desired location. It should also be noted that position sensors are utilized for determining the position of the pistons 80 so that the pistons 80 will not bottom out, and the position of the flange 46 will always be known.

Each of the shoes 86 (on each of the three support actuators 50) can be surrounded by a suitable seal that permits movement of the shoes 86 relative to the flange 46, so that there is some sliding movement permitted.

Each shoe 86 and, thus, each actuator 50 permits movement in four degrees of freedom. The degrees of freedom are linear motion along the axis of the pistons 80, which is perpendicular to the planes of the mounting plate 18 and the top plate 20, and three rotational degrees of freedom inside the spherical joint assembly for the balls 82. Rotary motion of the shoe 86 around the central axis of the pistons 80 is not likely due to friction, and that leaves two degrees of freedom for the orientation of the shoes 86 to be aligned with the flat mating surface 46A or 46B of the flange 46.

When the servovalve 107 is operated, the pressure in the lower chamber 104 provides a servocontrolled movement of both the upper and lower cylinder sections of the support actuators 50 up and also down under the controlled preload on the piston 80 mounted in the upper half actuator cylinder 76.

Figure 4:
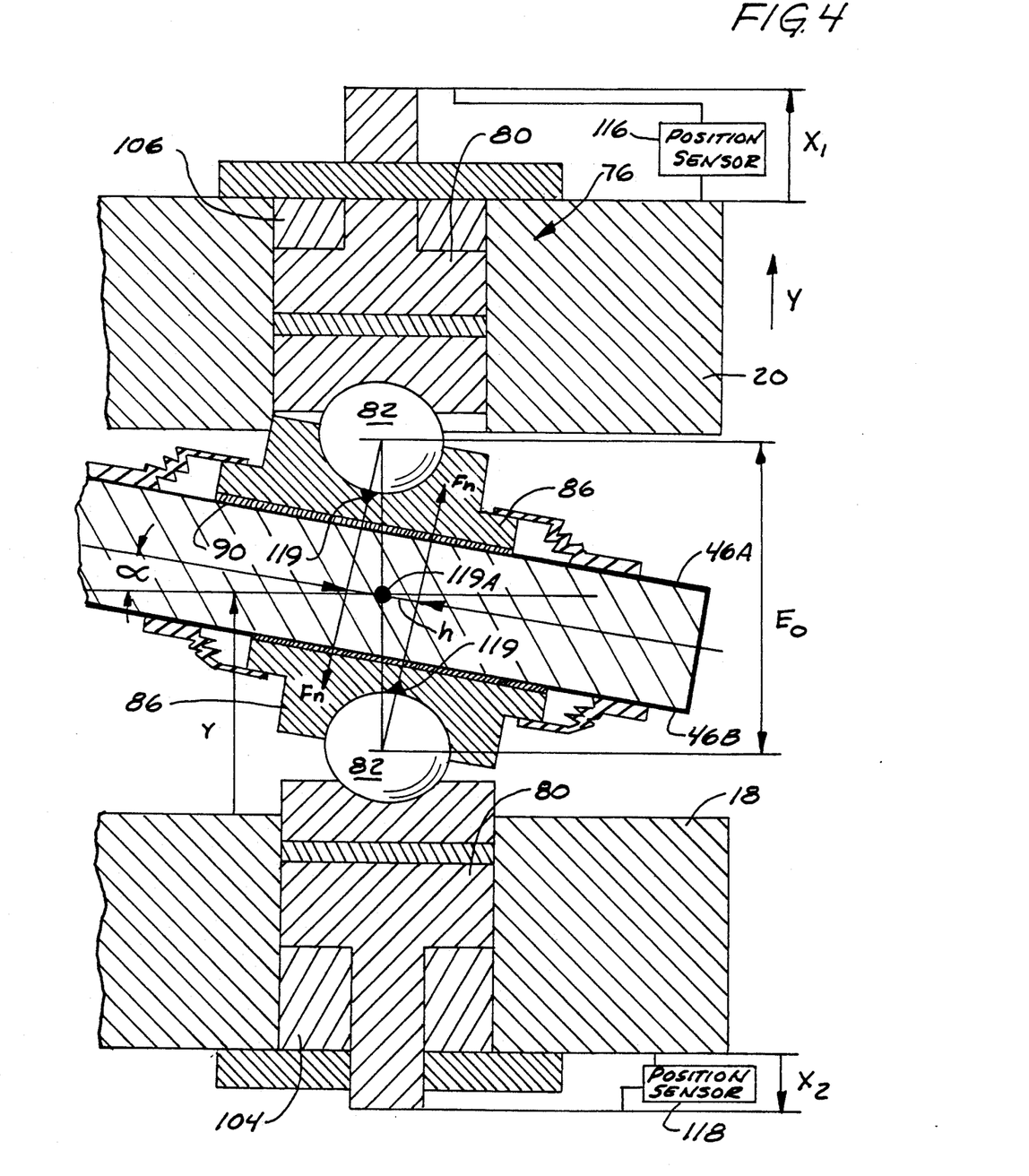
FIG. 4 is a schematic cross-sectional view representation of the supports shown in FIG. 3 indicating force sensors in place, and with the support carriage for the gear spindle at an exaggerated inclined angle for purposes of illustration.

Transducers are used for providing a feedback of force exerted pressure, as well as displacement. Position sensors indicated at 116 and 118 and force sensors both can be accommodated in the system, as shown in FIG. 4. Force also can be determined by differential pressure sensors that sense the differential between the pressure action on the upper and lower cylinder sections. The position sensors 116, 118 are used to determine the positions of the pistons. LVDT linear displacement transducers can also be installed for obtaining the positions or distances shown at X2 and X1.

At a "home" position defined during normal calibration procedures, the reading from the transducers of the positions shown at X1 and X2 are equal and all of the transducers for the three support actuators 50 will be equal. The movement of gear spindle carriage 42, or any part of it such as during tilting, can be registered by both displacement transducers and the readout of X1 and X2 for the three support actuators 50 will indicate that the gear spindle carriage 42 has been moved within the support actuator 50 for that particular shoe 86. The differences $\Delta X_1$ and $\Delta X_2$ can be used to establish the true movement of the gear spindle carriage 42.

Two parameters of motion must be considered. The linear vertical motion in the Y direction and the angular parameter $\alpha$ which is shown in FIG. 4. For both of them we can derive:

$$\Delta y = (\Delta x_1 - \Delta x_2)/2.0$$

and $$\alpha = \sqrt{\frac{2.0^* \Delta E}{E_0}}$$

where:

$$\Delta E = \Delta x_1 + \Delta x_2$$

and $E_0$ is a constant parameter which can be defined as:

$$E_0 = 2C + B$$

Since the angle $\alpha$ is relatively small (within 1 or 2 degrees) the amount of movement $\Delta y$ can be estimated as $$\Delta = x_1$$

The error in this case is:

$$\text{error} = \Delta E/2 = \alpha^2 E_0/4.0$$

For $E_0 = 5''$ and $\alpha = 1^0$, this error will amount to 0.0003".

Because of the small error, only one sensor can be used where the tilting of the gear spindle carriage 42 is not excessive. The second sensor is needed only when a larger range of angles is necessary for testing.

A force sensor 119 is also illustrated in FIG. 4, and it is essentially a small sensor built into the respective shoes 86, directly under the respective ball 82.

The ball receiving surface can have any desired type of built-in transducer 119. The surface of the ball receptacle in the shoe 86 can be a low friction material so that there is not any excessive friction at the force sensor 119. Force sensor 119 may be a piezoresistive sensor or other strain gauge type sensors actually doped into the surface of the ball receptacle and coated with a non-friction coating. A force sensor 119 is in each of the respective receptacles at the top and the bottom cylinder sections. Since the cavities that form hydrostatic bearings that are shown schematically in FIG. 4 at 90 minimize the friction between the surfaces 46A and 46B of the flange 46, there is no component of reaction force parallel to the surfaces of the flange 46 between the flange surfaces 46A and 46B and the respective shoes 86. Thus, the reacting force between the shoes 86 and the flange 46 must be normal to the surface of the shoe 86 and also pass through the center of the balls 82. This force can be registered by the force sensor 119 placed at the apex between the ball 82 and the shoe bed.

The geometry of the support system creates a set of forces ($F_n$) which represents a moment around the center point between the two balls 82, and this center point is indicated at 119A in FIG. 4. The amount of torque developed by those forces $F_n$ depends on the angle $\alpha$ and the dimensions of the part, which is shown at E.

Also, note that in FIG. 4, the lower support actuator 50 which is represented schematically with the position sensor 118 raised, has extra oil in the chamber 104 over that in the chamber 100. The chambers 100, 104 are provided to have enough room for accommodating this motion.

The torque can be expressed as follows:

$$T = F_n^* h$$

Where:

$$h = E_0 \sin\alpha = E_0 \alpha$$

For additional confidence in the results, sensors such as Electric Clinometers, for example those sold under the trademark AccuStar indicate the angles with better than a 0.001 degree resolution. Optical non-contact gauging devices also can be used and laser-based interferometers can be used.

Thus the integrated support actuators 50 of this gear testing system 10 are controlled in a conventional manner and provide a substantial benefit by increasing rigidity and still providing for easily measured loading and easily controlled positioning for gear set testing. After the gears are positioned at correct settings, the set may be run for endurance testing or the noise level determined. Changes in gear position can be made and the gear set reevaluated.

Figure 5:
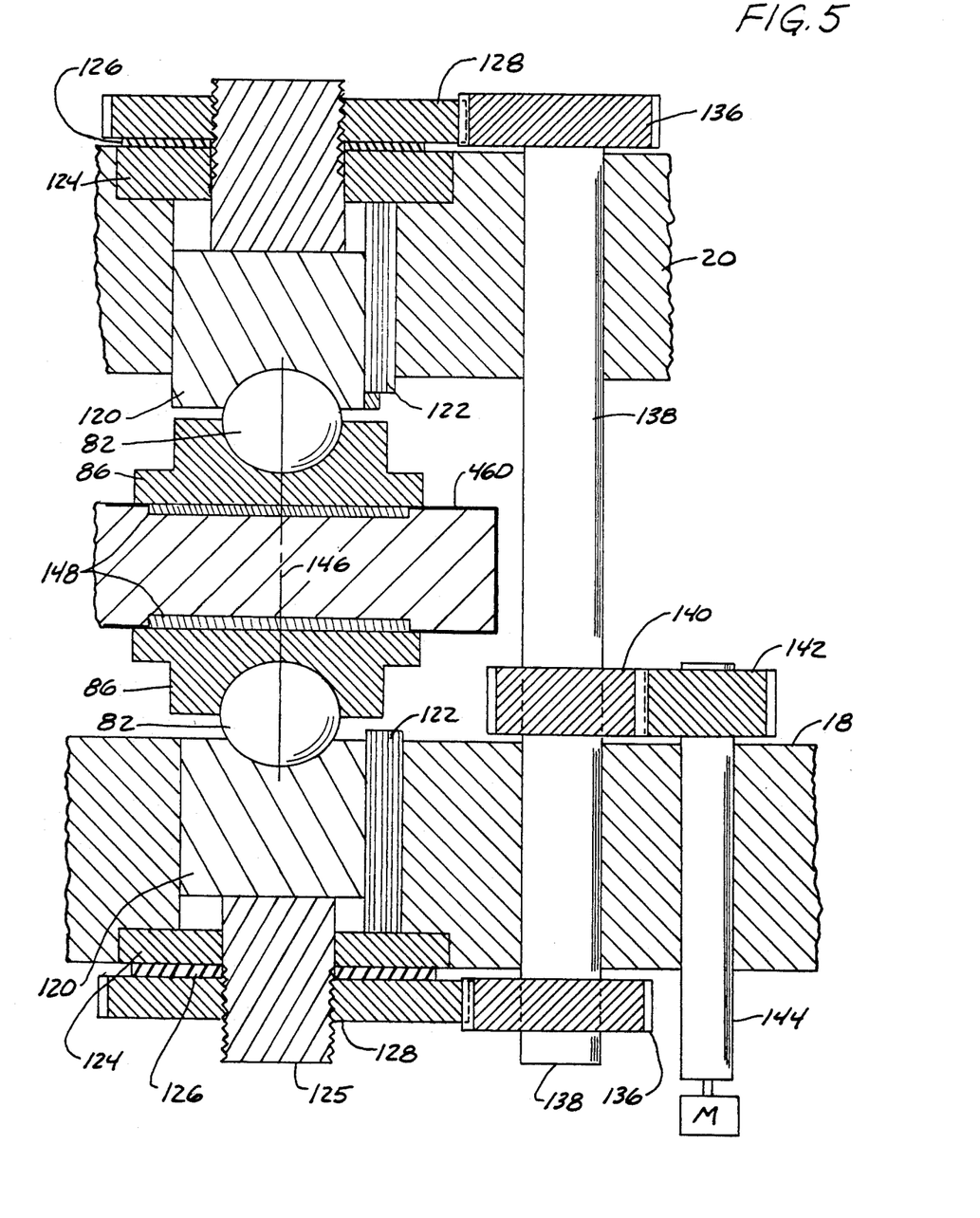
FIG. 5 is a schematic cross-sectional view of a modified form of the supports for the gear spindle carriage displacement control utilized with the present invention.

FIG. 5 is illustrative of a gear-type system for adjusting the shoes 86. A very schematic showing is made and the ball seats, sliding shoes 86 and the flange 46 of the gear spindle carriage 42 are all positioned as before, as are the top and mounting plates 20 and 18.

In this form of the invention, however, in place of hydraulic cylinders or support actuators 50, a pair of sliding blocks 120 are placed in bores in the top and mounting plates 20 and 18, respectively. These blocks 120 can have a circular cross-section, or other selected cross-sectional shapes but they are each prevented from rotating by having a separate key or spline member indicated at 122 fastened in place and extending along the axis of movement of the respective block 120.

Suitable guide supports 124 are fixed to the outer sides of the plates 20 and 18 and are bored to guide threaded shafts 125 fixed to the blocks 120. The guide supports 124 hold the blocks 120 in position. Thrust bearings 126 are provided between the outer surfaces of the guide supports 124 and drive gears 128 that are threadably mounted onto the respective shaft 125. A second set of gears 136 are driven by a common drive shaft 138 that is rotatably mounted in both the mounting and top plates 18 and 20. The drive shaft 138 has the gears 136 mounted at opposite ends thereof and the gears 136 mesh with the drive gears 128. A gear 140 drivably mounted on the drive shaft 138 meshes with a gear 142 that is drivably mounted on a motor shaft 144. When powering the gear 142 through the use of the motor shaft 144, the drive shaft 138 can be rotated, and the gears 136 and 128 will be rotated. The drive gears 128 have threaded bores that thread on the shafts 125, as stated, and by rotation of the gears 28, the blocks 120 are made to move in direction along an axis indicated at 146.

This structure provides for a particularly rigid assembly with little compressibility in the system because of mechanical loading through the threaded drive gears 128 and sliding blocks 120, but yet permits the flange 46 to tilt as previously described, so that the degrees of freedom utilizing three of the modified support actuators 50 including the blocks 120 can be used in the same manner as previously described.

A flange 46D in this form of the invention can have bearing plates 148 embedded in the surfaces on which the sliding shoes 86 slide. As stated, the balls 82 in FIG. 5 are seated in part spherical sockets in the blocks 120 and shoes 86, respectively.

Figure 6:
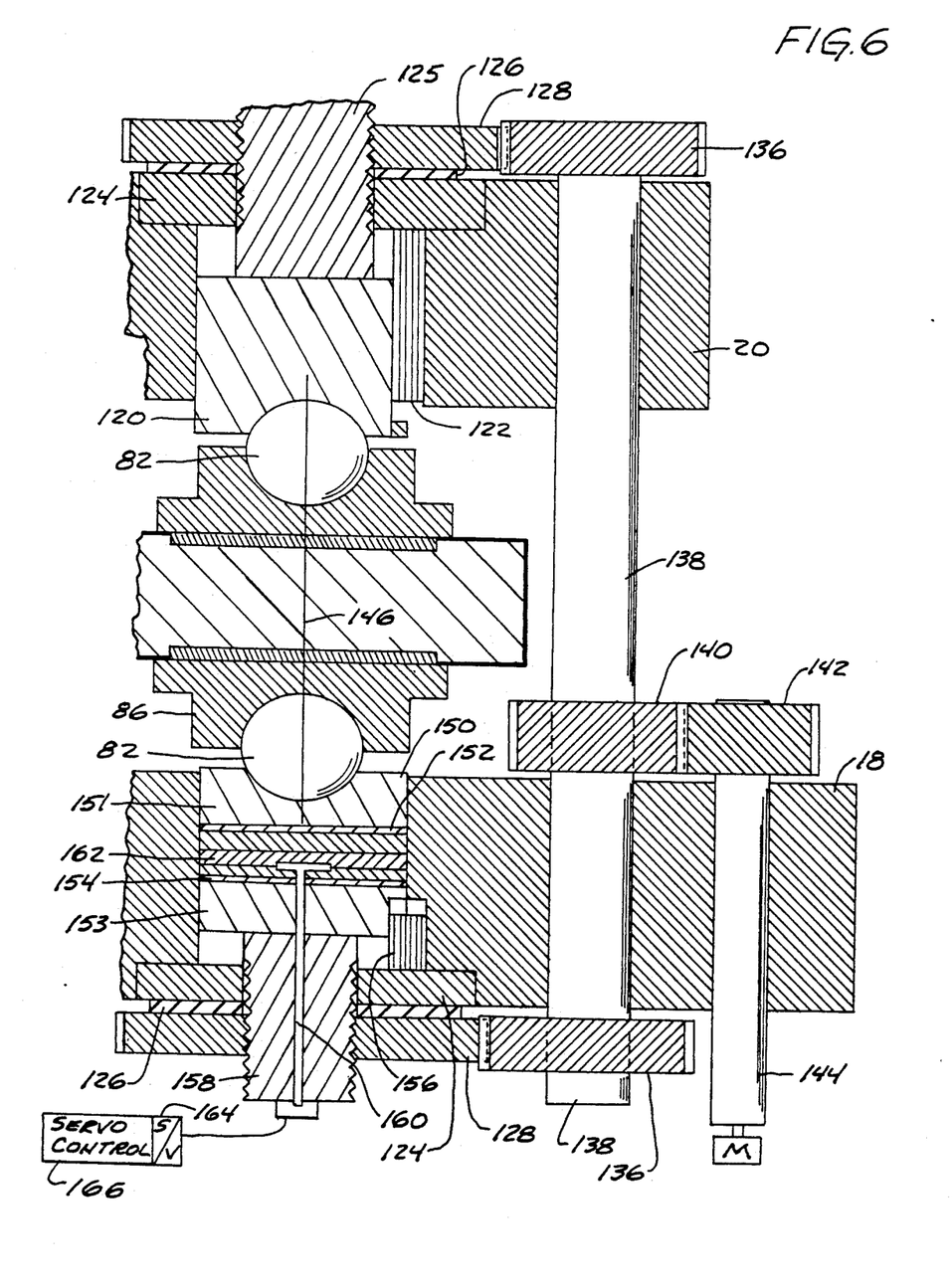
FIG. 6 is a schematic cross-sectional view of the apparatus similar to FIG. 5 and showing a combination mechanical and servohydraulic displacement control.

FIG. 6 is illustrative of a combination gear type displacement control system and also incorporating a servocontrolled actuator for final acts of control for adjusting the shoes 86. A schematic shows that the ball seats, the sliding shoes 86, and the flange 46 to the gear spindle carriage 42 are all positioned as before, as are the top and mounting plates 20 and 18. In this form of the invention, the sliding block 120, as shown in FIG. 5, is placed in the bore in the top plate 20. The block 120 is constructed as shown in FIG. 5, and includes the guide support 124 for holding it in place and guiding the threaded shaft 125. The thrust bearing 126 is positioned, and the drive gear 128 is threadably mounted onto the shaft 125.

On the lower side of the system, in mounting plate 18, in place of the block 120, a "hybrid" block 150 is mounted in the bore. The ball 82 is supported by a first section which forms a piston 151, that has a suitable seal 152 relative to the bore in the mounting plate 18. A backing block 153 is slidably mounted in the bore, independently of the piston 51, and has a seal 154 thereon.

The backing block 153 is slidably mounted in the bore with piston 151, and has a splined member or keyed member 156 which fits into a keyed receptacle in the backing block 153 to permit the block to slide axially along the axis 146 while preventing rotation.

The backing block 153 has a threaded shaft 158 at an outer end thereof which corresponds to the threaded shaft 125, and one of the drive gears 128 is threadably mounted on the threaded shaft 158. A suitable guide support 124 is also used as well as a thrust bearing 126.

A bore 160 is provided through the threaded shaft 158, and the central portion of the backing block 153, and opens into a chamber indicated at 162 formed between the piston 151 and the backing block 153. The bore is connected through suitable lines to a servovalve 164, which is run from suitable servocontrols 166.

The drive gear 128 on the threaded shaft 158, as well as the drive gear 128 at the upper end on the shaft 158, are driven via the drive gears 136, mounted onto the drive shaft 138 as in the first form of the invention. The drive shaft 138 in turn can be driven from a motor, the motor shaft 144, the gear 140 drivably mounted on the shaft 138 and the gear 142.

The major, that is, gross, adjustments for positioning can be made through operation of the gear system, including the drive gears 128 operating on shafts 125 and 158, respectively. The chamber 162 would be carrying a very small volume of oil, and the servocontrols 166 operating through the servovalve 164 would provide for very fine adjustments in positioning in response to desired signals for active control and minor adjustments.

Otherwise, the system of FIG. 6 would operate as previously explained, but provides the advantages of a low volume of oil for greater rigidity, yet providing active control of a servovalve system for fine adjustments.

The loading and unloading procedures for the gear can be achieved by having an adequate movement of the actuators 50, 54 to lower the gear to disengage the gear from the pinion, and after loading and unloading, the controls include additional sensors to return the gear carriage to its original position.

Movement of the gear support carriage in directions parallel to the support plates in both forms of the invention is through use of actuators screw or the like, as shown by horizontal actuators 54 in FIG. 1.

It is apparent that the flange 46 could comprise three individual support locations, much like ears that extend outwardly from the hub.

Although the present invention has been described with reference to preferred embodiments, workers skilled in the art will recognize that changes may be made in form and detail without departing from the spirit and scope of the invention.

What is claimed is:

1. A test system for gear testing comprising:
   a table having first and second spaced apart plates;
   means to join said plates together to create a space therebetween;
   means to support said first plate with a surface of the first plate opposite from the second plate;
   means to support a pinion on said second plate on a surface facing oppositely from the first plate;
   carriage means to support a gear with respect to both of said plates, said carriage means including a hub having a means for rotatably mounting the gear about an axis that extends through both plates, said hub having flange means that extend outwardly from the hub to form a plurality of support locations, said flange means being positioned in the space between the first and second plates;
   power means controlling the piston of the flange means relative to the plates in directions toward and away from the plates comprising a plurality of power actuators arranged around a central axis of the carriage means, each of the power actuators having a first section carried on the first plate and a second section carried on the second plate, each of said actuator sections providing a bearing support on a surface of the flange means and being controllable to engage the flange means on opposite sides thereof and to individually selectively move the flange means toward and away from the respective plates; and sensing means for determining relative placement of the carriage with respect to the table.

2. The system of claim 1 wherein said power actuators comprise hydraulic actuators, and each of the actuator sections comprises a piston supported in a cylinder formed on the respective plates, the piston bearing on said flange means.

3. The system of claim 1 wherein said power actuator sections slidably engage opposite surfaces of the flange means on said carriage means, and hydrostatic bearing means between the sections of the power actuators that engage the flange means and surfaces of the flange means.

4. The system of claim 3 wherein the power actuator sections of each power actuator are substantially aligned on opposite sides of the flange means.

5. The system of claim 4 wherein at least one of the actuator sections includes a piston movable toward and away from the flange means under fluid pressure.

6. The system as specified in claim 3 wherein each of said actuator sections comprises a piston movable relative to the respective plate, and a separate shoe between each of the pistons and the corresponding surface of the flange means, each of the shoes being coupled to the piston through a spherical ball joint connection.

7. The system of claim 1 wherein at least one of the power actuators comprises a mechanically driven actuator.

8. The system of claim 7 where the mechanically driven actuator includes a pair of sliding sections mounted in a bore, an outer section having a mechanical drive, the two sections being spaced apart to form a hydraulic cylinder for the actuator therebetween in the bore, and control means connected to the hydraulic cylinder to control the position of an inner section relative to the outer section, the outer section providing the bearing support on the flange means.

9. The system of claim 8 wherein the mechanically driven actuator comprises an actuator having a threaded shaft, and wherein the mechanical drive of the outer section comprises a threaded member threadably mating with the threaded shaft.

10. The system of claim 1 and means to control the position of the carriage means in direction generally parallel to the plates.

11. The system of claim 1 and further comprising loading means connected to the gear to apply selective brake loads.

12. The system of claim 1 wherein the plurality of actuators comprises three actuators radially displaced from the central axis of the carriage means and angularly separated from an adjacent actuator by approximately 120 degrees.

13. A test system for gear testing comprising:
a table having first and second spaced apart plates;
means to join said plates together to create a space therebetween;
means to support said first plate with a surface of the first plate opposite from the second plate;
means to support a pinion on said second plate on a surface facing oppositely from the first plate;
carriage means to support a gear with respect to both of said plates, said carriage means including a hub having a means for rotatably mounting the gear about an axis that extends through both plates, said hub having flange means that extend outwardly from the hub to form a plurality of support locations, said flange means being positioned in the space between the first and second plates;
power means controlling the piston of the flange means relative to the plates in directions toward and away from the plates comprising a plurality of power actuators arranged around a central axis of the carriage means, each of the power actuators having a first section carried on the first plate and a second section carried on the second plate and substantially aligned with the corresponding first section, each of said actuator sections providing a bearing support on a surface of the flange means and being controllable to engage the flange means on opposite sides thereof and to individually selectively move the flange means toward and away from the respective plates; and
sensing means for determining relative placement of the carriage with respect to the table.

14. The system as specified in claim 13 wherein each of said actuator sections comprises a piston movable relative to the respective plate.

15. The system of claim 13 wherein at least one of the power actuators comprises a mechanically driven actuator.

16. The system of claim 13 wherein said power actuators comprise hydraulic actuators, and each of the actuator sections comprises a piston supported in a cylinder.

17. The system of claim 16 wherein at least one cylinder is formed on one of the plates.

18. The system of claim 13 and further comprising loading means connected to the gear to apply selective brake loads.

19. The system of claim 13 wherein the plurality of actuators comprises three actuators radially displaced from the central axis of the carriage means and angularly separated from an adjacent actuator by approximately 120 degrees.

* * * * *